United States Patent [19]

Mitsusawa et al.

[11] Patent Number: 4,997,457

[45] Date of Patent: Mar. 5, 1991

[54] COLORED FLAME SOLID FUEL AND METHOD

[75] Inventors: Tomochiyo Mitsusawa; Hiroshi Ise, both of Gunma, Japan

[73] Assignee: Yugen Kaisah Gunma Kakoh Seizosho, Gunma, Japan

[21] Appl. No.: 462,742

[22] Filed: Jan. 9, 1990

[30] Foreign Application Priority Data

Jan. 10, 1989 [JP] Japan ................................. 1-3368

[51] Int. Cl.$^5$ .............................................. C10L 5/40
[52] U.S. Cl. ........................................ 44/550; 44/642
[58] Field of Search ................................. 44/7.5, 550

[56] References Cited

U.S. PATENT DOCUMENTS 2,504,211  4/1950  Means ................................. 44/7.5
3,468,615  9/1969  Carey .................................. 44/7.5
4,302,208  11/1981  Wood et al. ........................ 44/7.5

FOREIGN PATENT DOCUMENTS 0046244  5/1972  Japan .................................. 44/7.5
0217597  12/1983  Japan .................................. 44/7.5
0566385  7/1974  Switzerland ........................ 44/7.5

Primary Examiner—Jacqueline V. Howard
Attorney, Agent, or Firm—Juettner Pyle Lloyd & Verbeck

[57] ABSTRACT

A solid gelled fuel for producing a visible flame of various colors, which contains methyl alcohol as a primary ingredient in a solid gel with the addition of dibenzylidene sorbitol, cellulose ester and ethylene glycol, with a flame coloring compound being suspended in the solid.

11 Claims, No Drawings

COLORED FLAME SOLID FUEL AND METHOD

BACKGROUND OF THE INVENTION

This invention relates to solid or jelled fuels and more particularly to a clean burning, smokeless fuel having a colored flame, which may be used, for example as a replacement for candles.

Candles are often used for special events such as wedding receptions and banquets to create an atmosphere appropriate for the occasion. Known candles may be obtained in a variety of colors, but the color of the flame is always orange. Candles are made from wax and may generate excessive smoke.

Torches which use liquid fuel are also available, tut such devices emit excessive smoke and cannot be used indoors. In addition, the flame from the torch is orange in color.

SUMMARY OF THE INVENTION

An object of the present invention is to provide solid fuel which is capable of burning without smoke and has a highly visible flame in a variety of colors, such as green, blue or crimson.

The foregoing objective is accomplished by the provision of a solid fuel based on methyl alcohol. The methanol is mixed with minor amounts of dibenzylidene sorbitol, a cellulose ester and ethylene glycol and/or glycerol, and the mixture is heated sufficiently to melt or dissolve the solids. A flame coloring material such as a strontinum or copper compound is added to the mixture, and the mixture is cooled or quenched to make it solid. The resulting solid fuel is stable at room temperature and may be easily ignited. If the flame coloring agents were not added, the alcohol flame would be pale blue and not highly visible.

DESCRIPTION OF THE PREFERRED EMBODIMENTS

In accordance with the present invention, various jelling or solidifying agents are incorporated into methanol to produce a solid fuel. A mixture with methanol is prepared and contains from about 1.0 to about 3.0 percent by weight dibenzylidene sorbitol as a gelation agent, from about 0.5 to about 1.0 percent by weight cellulose ester as an assistant, and from about 3.0 to about 5.0 percent by weight ethylene glycol or glycerol as a macromolecular assistant. The cellulose ester, for example, includes compounds such as hydroxyethyl cellulose and hydroxypropyl cellulose. The assistant and macromolecular assistant are employed to accelerate the gelling process.

Preferably, the cellulose ester and ethylene glycol are added to the alcohol and dissolved. The dibenzylidene sorbitol is then added, and the mixture is heated sufficiently to melt or dissolve all of the solids. Preferably, the mixture is heated up to and beyond the boiling point (64° C.) of the methanol or higher, in the order of 65° to 69° C.

Thereafter, the mixture is allowed to cool, and the flame coloring material or materials are added before the mixture starts to gel, which is in the order of from about 25° C. to 35° C. From about 1.0 to about 5.0 of the flame coloring compound is added. The mixture is then cooled until it becomes a solid gel.

Prior to cooling, the liquid may be transferred to other containers of a particular size and shape in order to impart the desired shape to the final product.

As indicated, the flame coloring agent, in particulate form, is added to the mixture prior to gellation and is mixed to provide a uniform suspension. Thereafter, the mixture is rapidly cooled to a solid, such as by cooling with methanol and ice, in order to prevent segregation or separation of the flame coloring compound.

Various types of flame coloring agents may be employed, preferably compounds of alkaline-earth metals which produce a highly visible color when heated. For example, strontium chloride may be used to produce a crimson flame color. The use of cupric chloride will result in a green-blue flame. Other flame coloring agents, which may be added at the same level of one to five percent by weight include lithium chloride to produce a pink flame, colbalt chloride for a violet flame, and soda oxalate to produce a yellow flame.

Prior to the addition of the flame coloring agents, any water of hydration is preferably removed by heating, or by other dehydrating techniques, such as exposure to zeolite. The use of the anhydrous form facilitates gellation.

Following gellation of the mixture upon cooling, it is possible that some excess alcohol will rise to the top. If such is the case, the excess alcohol is allowed to evaporate by exposure to air.

From the foregoing, it will be understood that the final produce contains in excess of 85% methanol. When the mixture is burned, no smoke is produced, which would interfere with the visibility of the color. Also, the inclusion of a flame coloring compound results in a highly visible flame of the desired color. The size, shape and volume of the container may be varied to determine the size and shape of the flame, and the length of the burning cycle.

What is claimed is:

1. Method for making a solid fuel having a colored flame comprising the steps of preparing a mixture comprising dibenzylidene sorbitol, and in excess of 85% methanol, heating the mixture to produce a hot uniform liquid, adding a flame coloring compound to the mixture and then cooling the mixture to a solid.

2. The method of claim aim 1 wherein said mixture additionally comprises a cellulose ester.

3. The method of claim aim 2 wherein said mixture additionally comprises ethylene glycol.

4. The method of claim aim 3 wherein the mixture comprises from about 1.0 to about 3.0 weight percent dibenzylidene sorbitol, from about 0.5 to about 1.0 weight percent cellulose ester, and from about 3.0 to about 5.0 weight percent ethylene glycol.

5. The method of claim aim 1 wherein said flame coloring compound is strontium chloride.

6. The method of claim aim 1 wherein said flame coloring compound is cupric chloride.

7. The method of claim aim 1 wherein said flame coloring compound is dehydrated prior to addition.

8. The method of claim aim 1 wherein said flame coloring compound is added in the range of from about 1.0 to about 5.0 percent by weight.

9. A solid fuel having a colored flame comprising in excess of 85% methanol, from about 0.5 to about 3.0 percent by weight dibenzylidene sorbitol, and from about 0 5 to about 1.0 percent by weight cellulose ester, said solid being in the form of a gel comprising a flame coloring compound suspended therein.

10. The solid fuel of claim 9 additionally comprising from about 3.0 to about 5.0 percent by weight ethylene glycol.

11. The solid fuel mixture of claim aim 9 additionally comprising from about 3.0 to about 5.0 percent glycerol.

* * * * *